March 3, 1936.  J. W. BAIRD  2,032,392
BRAKE ADJUSTMENT INDICATING MEANS
Filed May 23, 1929
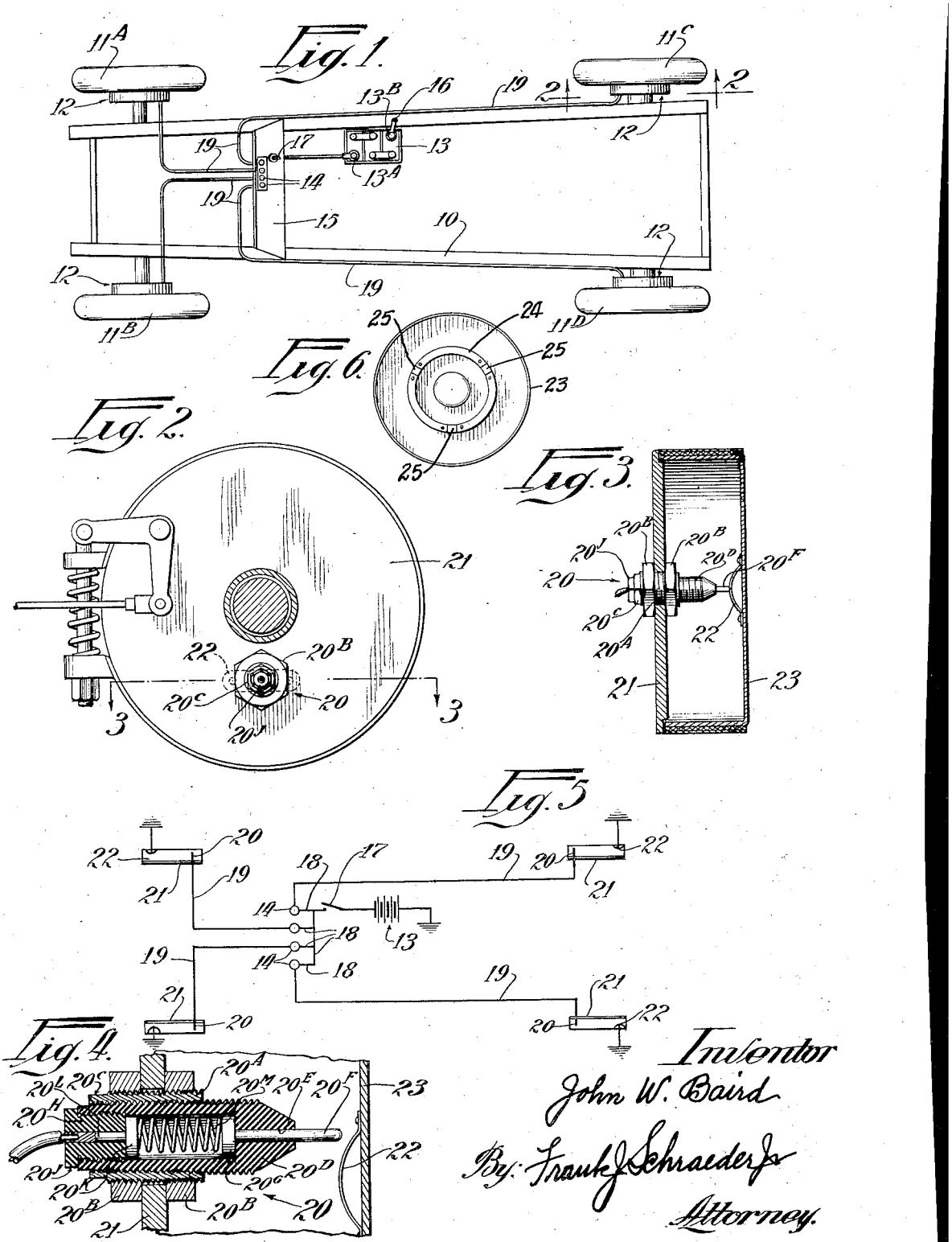
Inventor
John W. Baird
By Frank J. Schraeder Jr
Attorney Patented Mar. 3, 1936

2,032,392

UNITED STATES PATENT OFFICE 2,032,392

BRAKE ADJUSTMENT INDICATING MEANS

John W. Baird, Glen Ellyn, Ill.

Application May 23, 1929, Serial No. 365,263

2 Claims. (Cl. 177—311)

This invention relates generally to signal devices and has particular reference to automobile brake adjustment indicating means.

At the present time automobiles are equipped with either two or four wheel brakes. This invention is adaptable for use with either two or four wheel brakes for indicating the adjustment thereof.

One of the objects of the invention is to provide means for indicating, to the motor vehicle operator, the condition of the brake adjustment of any particular wheel relative to the brake adjustments of the other wheels of the vehicle.

Another object of the invention is to provide visible means for indicating which, if any, of the brakes are "locked" or out of adjustment.

When the brakes of a motor vehicle are properly adjusted, the movement of the foot brake pedal, or brake lever, will simultaneously apply all of the brake bands with equal pressure against the wheel brake drums but when one or more of the brakes are out of adjustment, one or more of the brake bands will engage their respective drums with the applied pressure while the remaining brake bands will fail or possibly only slightly engage their respective drums causing obviously the loss of the braking power of such unengaged remaining brakes.

My invention permits the motor vehicle driver to test the braking condition of the brakes at will, and to positively determine during the operation of the vehicle, which of the brakes are "locked". If all of the brakes are equally adjusted, visible electric light signals, one for each brake, will clearly indicate such condition.

With the above and other objects in view, my invention consists in the novel combination and construction of the parts and members shown in preferred embodiment in the accompanying drawing, described in the following specifications, and particularly pointed out in the appended claims.

Referring to the illustrations: Fig. 1 is a diagrammatic plan view of the frame and wheels of a motor vehicle and showing the general arrangement and application of my invention to four wheel brakes.

Fig. 2 is a cross section taken on line 2—2 of Fig. 1.

Fig. 3 is a vertical section taken through the wheel brake bands and brake drum.

Fig. 4 is a longitudinal section taken through the insulated positive lead which is mounted on the brake drum cover disk.

Fig. 5 is a diagram showing the electrical connections.

Fig. 6 is a view showing a modified contact ring.

Referring now to the several illustrations, 10 indicates a motor vehicle frame which is provided with wheels 11 having brake drums generally indicated in Fig. 1, by the numeral 12. An electric storage battery 13 is provided which is connected from its positive terminal 13A through a switch 17 with leads 18 to the terminals of the filaments of a plurality of electric light bulbs 14; there being one bulb for each brake set. The electric light bulbs 14 may be conveniently mounted upon the dash board 15.

The negative terminal 13B of the battery 13 is grounded to the frame 10 at 16, and the negative terminals of the bulb filaments are connected through the leads 19 to the insulated spring-pressed contacts generally indicated by 20 which are mounted in the brake cover disks 21.

The spring-pressed contacts 20 each comprise a metal sleeve 20A which is threaded exteriorly for mounting within the brake cover disk 21 and provided with lock nuts 20B. The outer end of the sleeve 20A is provided with a hexagon head formation 20C for suitable wrench engagement to facilitate its threaded insertion and longitudinal adjustment into the brake cover disk 21.

Screw mounted within the interior of the sleeve 20A, is a tubular member 20D of electrically insulated material having a restricted opening 20E for the slidably mounted metal contact pin 20F, the outer projecting end of which is rounded and the inner end of which is provided with an integral head 20G normally resting against the shoulder formed within the member 20D.

The member 20D is also threaded interiorly from its outer or exposed end for the screw plug 20H which is also made of electrically insulated material and formed with a hexagon head 20J for suitable wrench engagement to facilitate its threaded insertion within the member 20D. The plug 20H is provided with a longitudinal bore for the extension 20K of a metallic integral disk 20L. A coil spring 20M is mounted between the disk 20L and the head 20G to positively retain the pin 20F in its normal position, as shown in Fig. 4, projecting beyond the end of the member 20D for intermittent engagement with a contact ramp 22 which is rigidly mounted to the inner side of the rotatable brake drum 23 and obviously arranged radially to contact with the rounded end of the pin 20F.

The outer end of the extension 20K is provided with a pocket to receive the end of the lead or conductor 19 which is soldered therein.

It is now readily apparent that the lead 19 is conductively connected with the disk 20$^L$, and through the coil spring 20$^M$ with the pin 20$^F$, and that the grounded side of the electric light bulb circuits will be closed or completed in each revolution of the wheel brake drums 23 during the engagement of the ramp contact 22 with the spring-pressed pin 20$^F$; the coil spring 20$^M$ permitting a slight inward sliding movement of the pin 20$^F$ during its contact with the ramp contact 22.

It is also obvious, that when the switch 17 is closed, the electric circuits to all of the bulbs 14 will be intermittently closed by the repeated contacting of the ramp 22 with the pin 20$^F$ to thus cause an intermittent flashing signal of the electric bulbs 14.

Assuming now that the brakes are properly adjusted all of the four bulbs 14 will under such conditions continue to flash successive light signals indicating to the driver of the motor vehicle that all wheels with their respective brake drums are revolving. If upon brake application, any of the brakes be out of adjustment whereby one or more of the brakes act quicker to "lock" such wheels against rotation, the respective or particular bulbs connected in circuit therewith, will cease to continue their intermittent flashing signals and will thus indicate to the driver which of such brakes are "locked" whereupon the brakes may then be adjusted to insure their simultaneous braking action. If all of the light bulbs should simultaneously cease flashing it would indicate that all of the brakes were properly coacting in braking action.

It is obvious, that if one or more of the brakes happen to "lock" at the moment of the contact of the pin 20$^F$ with the ramp 22 a continuous light signal will appear which will readily be understood.

It is readily understood also that the ramp contacts 22 may be extended to any desirable length to afford a longer duration of the light signal and that instead of one ramp, two or more ramps may be arranged or aligned in the circle for repeated long contacts with the pin 20$^F$.

Fig. 6 shows a modified contact ring 24 which may be rigidly fixed on the inner face of the brake drums 23 and conductively connected thereto. A plurality of non-conductive fiber strips 25 may be inserted in the face of the ring 24 to break the circuit as the end of the pin 20$^F$ rides over the ring 24.

The ring 24 may be employed as a substitute for the ramp 22 to produce long light signals with short interruption.

Other changes may be made in the construction and arrangement of the parts and members without departing from the spirit of my invention as defined in the appended claims.

I claim:

1. In an indicating means for testing relative efficiency conditions of the brakes of the wheels of a vehicle, including a brake for each wheel, an electrically controlled signal for each wheel, a normally open circuit for each signal, means for simultaneously connecting all of said circuits with a source of energy when test is desired, and means controlled by the movement of each wheel to intermittently energize the signal for that wheel, whereby in the normal operation of the vehicle during test the signals operate intermittently with substantial uniformity prior to brake application, said signals following brake application being controlled by the movement of each wheel as governed by its brake, whereby under unequal brake adjustments the speed of one wheel will be retarded sooner than the speed of another wheel and the signals of the retarded wheel will be out of normal uniformity with the other signals, to thereby indicate unequal brake adjustments.

2. A construction as defined in claim 1, wherein each signal is energized during each revolution of the wheel for which that signal is arranged and wherein any interruption in the time period of such signal will indicate a retardation in the normal revolution of the wheel, to thereby utilize the signals of all wheels in their relative time periods of energization as indicating after brake application whether one or more of the wheels are less retarded in revolution by the brakes than others of the wheels.

JOHN W. BAIRD.